(12) United States Patent
Eagles et al.

(10) Patent No.: US 8,037,667 B2
(45) Date of Patent: Oct. 18, 2011

(54) STALK ROLL FOR USE IN AN AGRICULTURAL HARVESTING MACHINE

(75) Inventors: John O. Eagles, East Moline, IL (US);
Michael D. Howe, Orion, IL (US);
Steven T. Rieck, Cambridge, IL (US);
Fred H. Wallace, Geneseo, IL (US);
Janet R. Willett, East Moline, IL (US)

(73) Assignee: Deere & Company, Moline, IL (US)

( * ) Notice: Subject to any disclaimer, the term of this patent is extended or adjusted under 35 U.S.C. 154(b) by 367 days.

(21) Appl. No.: 12/207,927

(22) Filed: Sep. 10, 2008

(65) Prior Publication Data

US 2009/0188229 A1 Jul. 30, 2009

Related U.S. Application Data

(60) Provisional application No. 61/024,249, filed on Jan. 29, 2008.

(51) Int. Cl.
*A01D 45/02* (2006.01)

(52) U.S. Cl. .................. 56/103; 56/51; 56/104

(58) Field of Classification Search ............ 56/14.2, 56/51, 52, 62, 94, 98, 99, 103–105, 109, 56/110
See application file for complete search history.

(56) References Cited

U.S. PATENT DOCUMENTS

| 2,777,273 | A | * | 1/1957 | Heth ........................... 56/104 |
| 3,462,928 | A | * | 8/1969 | Schreiner et al. ............ 56/104 |
| 3,832,836 | A | * | 9/1974 | Anderson .................... 56/104 |
| 3,858,384 | A | * | 1/1975 | Maiste et al. ................. 56/14.2 |
| 4,434,606 | A | * | 3/1984 | Rhodes et al. ............... 56/106 |
| 5,040,361 | A | * | 8/1991 | Briesemeister ............... 56/52 |
| 6,050,071 | A | | 4/2000 | Bich et al. |
| 7,716,908 | B2 | * | 5/2010 | Christensen et al. ........ 56/104 |
| 7,762,739 | B2 | * | 7/2010 | Blanchard .................. 403/322.2 |
| 2003/0037526 | A1 | * | 2/2003 | McClain ..................... 56/15.9 |
| 2004/0123577 | A1 | * | 7/2004 | Resing et al. ............... 56/104 |
| 2007/0193241 | A1 | * | 8/2007 | Rieck et al. ................. 56/104 |
| 2007/0266689 | A1 | * | 11/2007 | Calmer ........................ 56/62 |
| 2010/0043371 | A1 | * | 2/2010 | Rieck et al. ................. 56/14.7 |

FOREIGN PATENT DOCUMENTS

EP 1820388 A 8/2007

OTHER PUBLICATIONS

European Search Report dated Apr. 22, 2009, (5 pages).

* cited by examiner

*Primary Examiner* — Thomas Will
*Assistant Examiner* — Mai Nguyen
(74) *Attorney, Agent, or Firm* — Taylor IP, P.C.

(57) ABSTRACT

A stalk roll for a corn head row unit has a conical seat and a spherical seat for mounting the stalk roll on a stalk roll driveshaft of a row unit. Each row unit has a drive shaft with a corresponding conical portion and a threaded fastener with a corresponding spherical portion for capturing the stalk roll on the drive shaft between mating conical shaft and stalk roll portions toward one end and mating spherical shaft and fastener portions at the other stalk roll end.

18 Claims, 8 Drawing Sheets

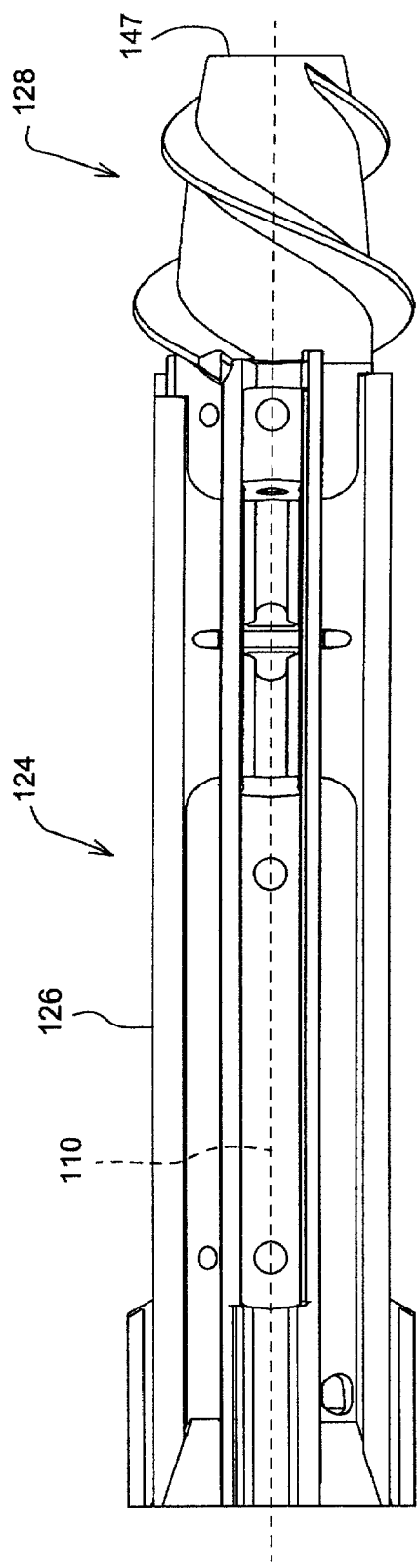
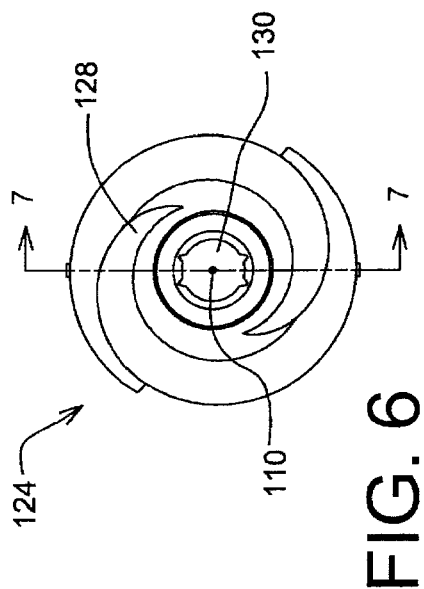
FIG. 5
FIG. 6

STALK ROLL FOR USE IN AN AGRICULTURAL HARVESTING MACHINE

CROSS REFERENCE TO RELATED APPLICATIONS

This application claims the benefit of U.S. Provisional Application No. 61/024,249, filed Jan. 29, 2008.

FIELD OF THE INVENTION

The present invention relates to agricultural harvesters, and more particularly to stalk rolls for corn heads of agricultural harvesters.

BACKGROUND OF THE INVENTION

Corn heads are used with a combine base unit to permit the harvesting of corn. Corn heads include a frame and a toolbar extending across the width of the frame to which row units and optional chopping units are attached. Each row unit includes two adjacent stalk rolls mounted for rotation on adjacent rotating shafts extending from a row unit gearcase. The stalk rolls are long and slender, cantilevered forward and generally horizontal from the row unit gearcase on which they are mounted. The two stalk rolls define a gap therebetween into which corn stalks are inserted during operation. Each of the stalk rolls are fixed to a respective rotating shaft that extends from the front of a row unit gearcase.

One current technique for fixing a stalk roll to a corn head gearcase output shaft employs two bolts and two nuts as well as a set of double roll pins to fix the axial location of the stalk roll on the shaft. Another known technique employs a long bolt having a conic (frustoconical) contact surface engaging a conic stalk roll seat at one end of the stalk roll and a conic surface on the output shaft engaging a conic surface toward the other stalk roll end. The axis of conic engagement at one end is rarely perfectly coaxial with the axis of conic engagement near the other end. As the bolt is tightened, a bending moment is introduced. If the shaft stiffness prevents bending, one or both of the contact surfaces will have point contact, not full conic surface compliance, thus having an increased tendency to loosen or fail.

The gearcase output shafts drive the stalk rolls in a direction that pulls the corn stalks downward between the two rolls and pulls off the ears of corn on the stalks. As the stalk rolls rotate and pinch the corn stalks therebetween, they experience fluctuating loads in a direction perpendicular to the longitudinal extent of the rolls and shafts. These fluctuating loads can loosen the threaded fasteners that secure the stalk rolls to their rotating shafts. What is needed is a stalk roll that does not loosen as easily. What is also needed is a stalk roll that can be easily removed while still providing this better attachment.

What is also needed is a stalk roll that can be held in closer concentric alignment to the shaft on which it is supported in order to maintain a constant spacing between itself and the adjacent stalk roll shaft.

SUMMARY OF THE INVENTION

The invention in one form is directed to a row unit for use in a corn head of an agricultural harvesting machine. The row unit has a gearcase having a pair of gearcase extensions with cantilevered drive shafts extending therefrom to receive a pair of stalk rolls. Each stalk roll has an elongated generally cylindrical hollow body with a longitudinal axis of rotation. There is an inner surface extending the length of the stalk roll with a rear end receiving a row unit gearcase extension and the stalk roll drive shaft extending from the gearcase extension as well as a front end for receiving a threaded fastener. The inner surface defines a conical seat that opens toward the rear end and a spherical seat opening toward the front end.

Preferably, each conical seat and each spherical seat is concentric with the longitudinal axis of the corresponding stalk roll. Each drive shaft may have a region including longitudinally extending splines with each stalk roll having a region of inner surface grooves engaging corresponding splines. The spherical seat and the conical seat are preferably disposed longitudinally on opposing sides of the region of inner surface grooves of the stalk roll.

BRIEF DESCRIPTION OF THE DRAWINGS

FIG. 5 is a side view of the stalk roll showing the elongated body with longitudinal knives and the conical front end of the stalk roll;

FIG. 6 is a front end view of the stalk roll showing the helical flights and the central aperture for receiving a threaded retaining fastener;

DETAILED DESCRIPTION OF THE INVENTION

Figure 1:
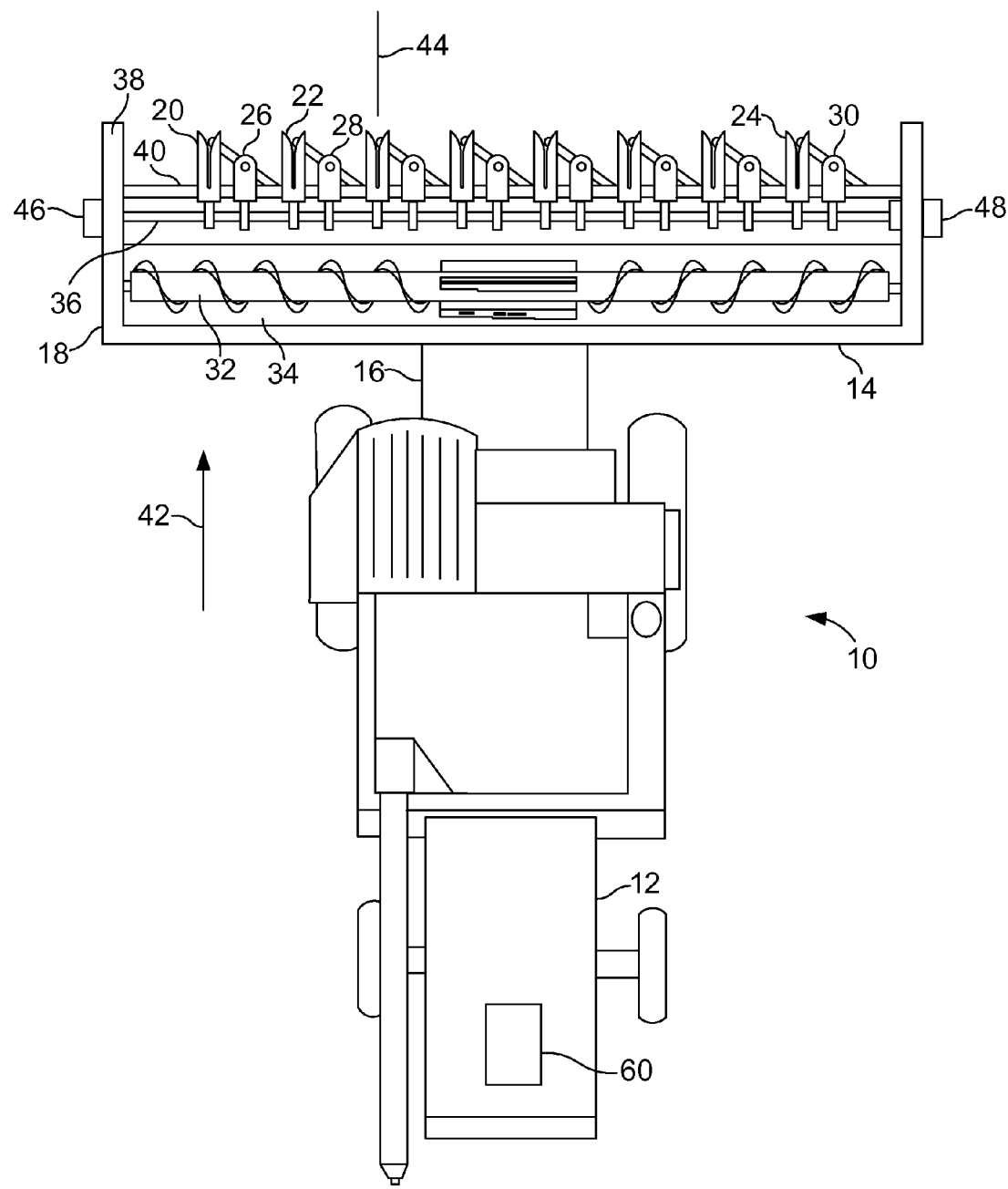
FIG. 1 is a schematic illustration of an agricultural harvesting machine of the present invention.

Referring now to FIG. 1, the agricultural harvester 10 can be seen to include a base unit or vehicle 12 and a corn head 14. Corn head 14 is supported on vehicle 12 by a feeder house 16. Corn head 14 includes a frame 18, a plurality of row units such as 20, 22 and 24 and may include a like plurality of chopping units such as 26, 28 and 30 mounted on the frame 18. Each row unit typically includes a cover or "snout", which are not shown for illustration purposes in the drawings. An auger 32 disposed in an auger trough 34 and a drive shaft 36 are both mounted on the frame. Frame 18 has a mainframe 38 and a toolbar 40 that is fixed to the mainframe. The toolbar extends across substantially the entire width of the corn head. The row units 20, 22, 24 are coupled to toolbar 40 and extend forward from the corn head 14 in a direction of normal forward travel, 42, to receive rows of corn plants such as 44 and process them. Each of the plurality of chopping units 26, 28, 30 may be mounted adjacent to a corresponding row unit 20, 22, 24 to cut the stalk of each corn plant as it is pulled into the adjacent and corresponding row unit.

Drive shaft 36 is an elongate member extending the entire width of the corn head and is driven in rotation by gearboxes 46 and 48 located on each side of the corn head. The gearboxes, in turn, are coupled by a series of conventional mechanical or hydraulic drive elements (not shown) to engine 60 of the vehicle 12 to be driven thereby. Drive shaft 36 rotatingly drives the row units and chopping units. Drive shaft 36 may be a single piece shaft, as shown herein, or it may be divided into multiple shafts coupled to two or more gearboxes. Row unit covers normally disposed on top of the row units and chopper units have been removed to better show the drive shaft, row and chopper units.

Figure 2:
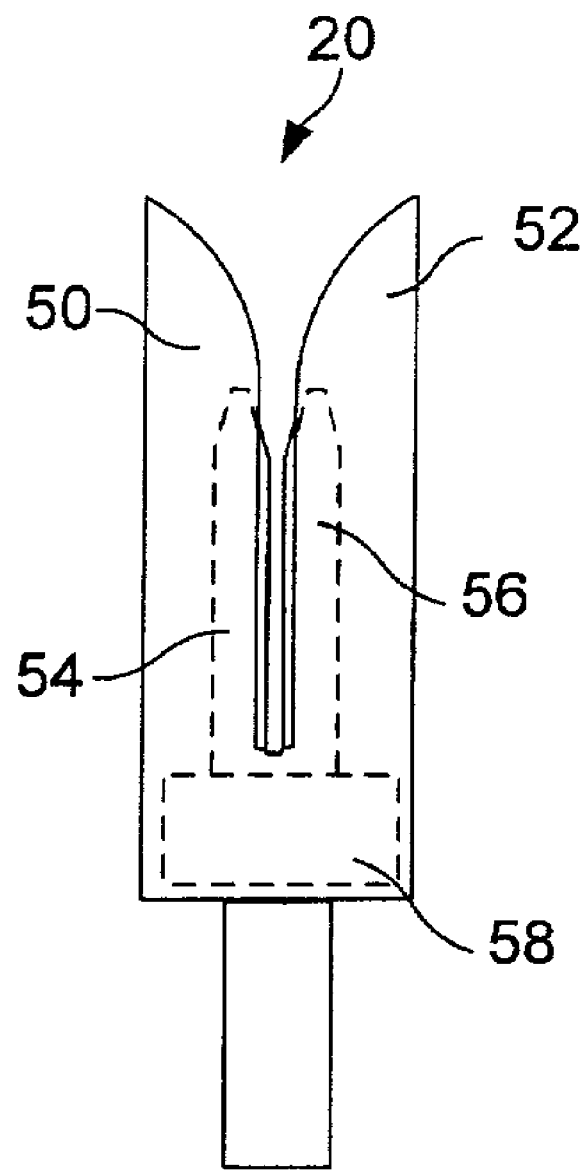
FIG. 2 is an enlarged plan view of an illustrative row unit of the harvesting machine of FIG. 1.

The illustrative row unit 20 of FIG. 2 includes a pair of deck plates 50 and 52. The deck plates normally support a pair of endless lugged chains entrained on idler cogs near the unit free end and on powered cogs near the tool bar for pulling stalks into the gap and moving ears of corn toward the auger. These and several other conventional row unit details have been omitted for clarity. A pair of stalk rolls 54 and 56 located beneath the deck plates 50 and 52 are supported on and powered by a gearcase 58. In operation, the stalk rolls rotate in opposite directions pulling corn stalks downwardly depositing ears of corn on the deck plates to be moved rearwardly by the lugged chains into the auger trough 34.

Figure 3:
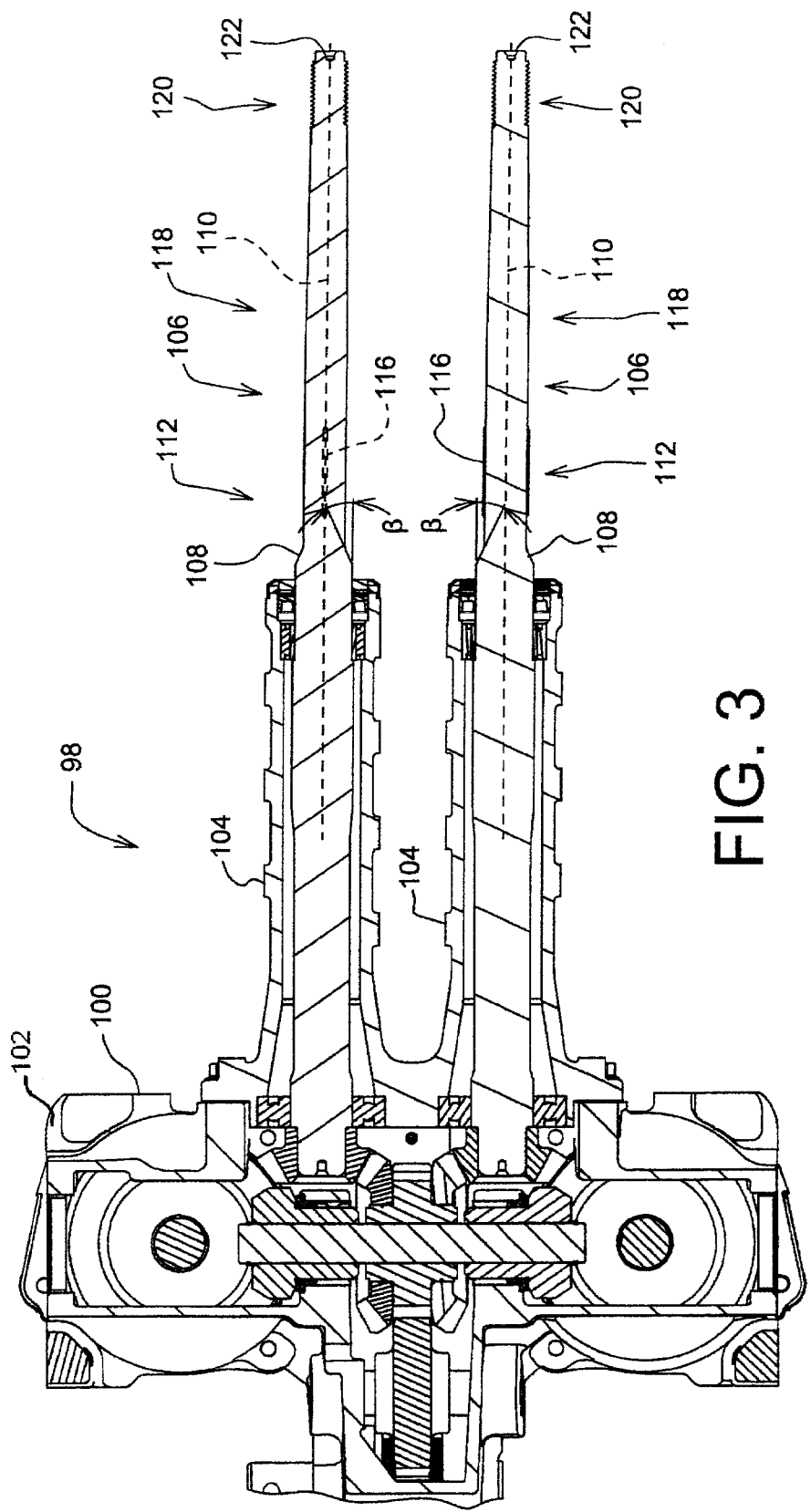
FIG. 3 is a cross-sectional view of a portion of a row unit on which two stalk rolls may be mounted.
Figure 4:
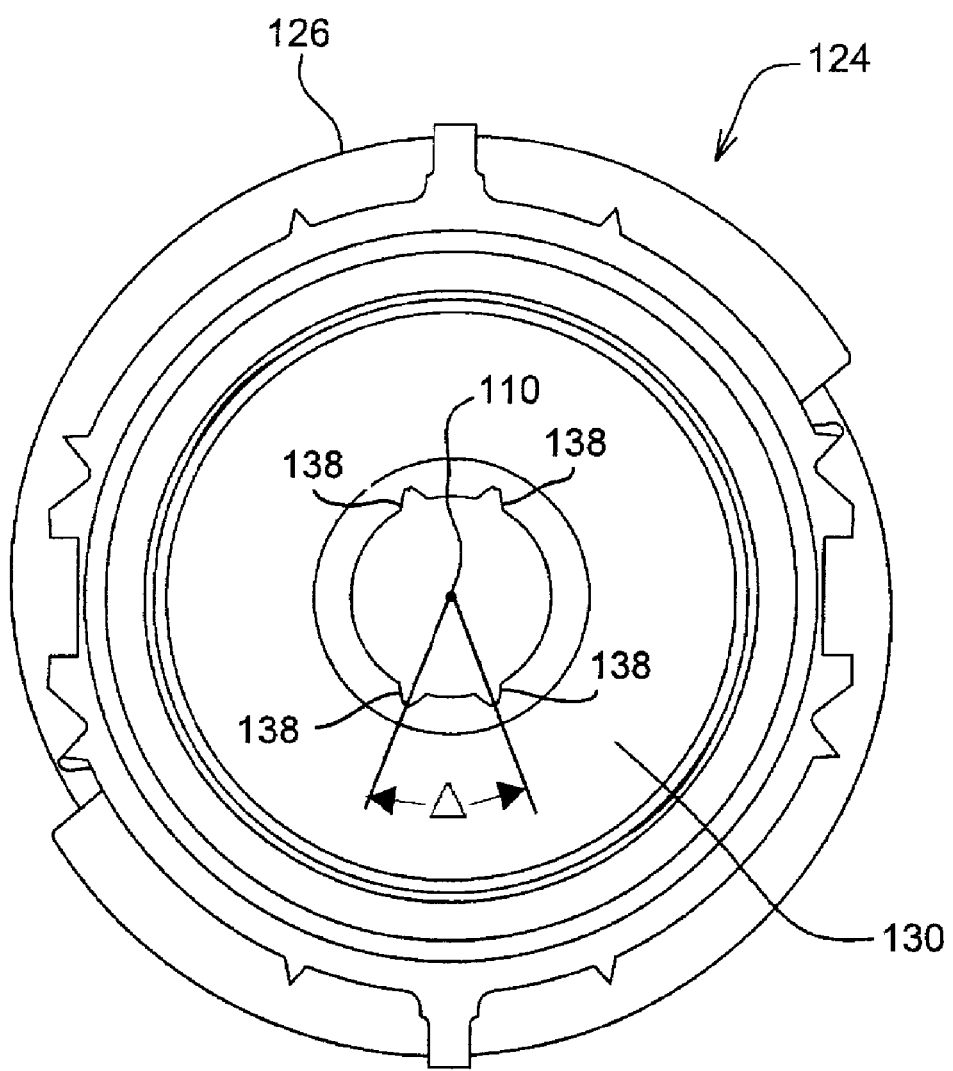
FIG. 4 is a rear end view of a stalk roll showing the arrangement of longitudinal knives and central aperture.
Figure 7:
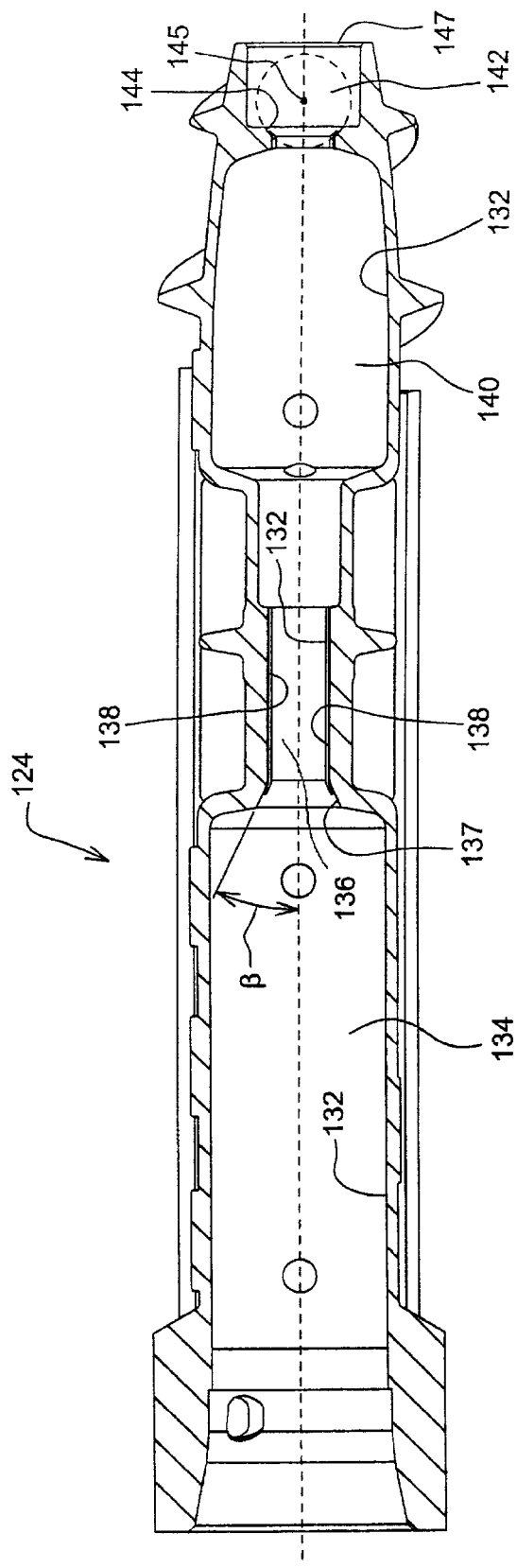
FIG. 7 is a cross section through the stalk roll taken at section line 7-7 in FIG. 6.

Referring now to FIG. 3, a portion of a row unit 98 has a gearbox 100 having a gearcase 102 from which two generally cylindrical gearcase extensions 104 (also known as "binoculars" due to their cylindrical shape and parallel orientation) extend. These extensions 104 support two stalk roll drive shafts 106 that extend forward therefrom. Drive shafts 106 have conical seats 108 disposed adjacent to the front end of the gearcase extensions. The terms "conic" and "conical" as used herein are not intended to be limited to a complete cone shape, and include frustoconical tapers or surfaces. These conical seats are symmetric about the longitudinal axis 110 of the gearcase extensions 104, stalk roll drive shafts 106, and stalk rolls 124, and are disposed at an angle β of about thirty degrees to the axis.

The stalk roll drive shafts 106 form right circular cylindrical drive sections 112 that extend in a forward direction from these conical seats 108. In these drive sections the surface of the stalk roll drive shafts 106 define four longitudinally extending splines 116 disposed on opposite sides of the circumference of the stalk roll drive shafts 106. Two pairs of splines are provided on each shaft, each pair in a diametrally opposed position from the other pair, and wherein each spline of each pair is located at an acute angle Δ, for example, 45 degrees, from the other spline of that pair. The stalk roll drive shafts next form a tapering section 118 that extends in a forward direction from the right circular drive section 112 tapering inwardly over the length of the tapering section 118.

The stalk roll drive shafts next form a threaded section 120 that extends in a forward direction from the tapering section until they terminate at the forward ends 122 of the stalk roll drive shafts. The forward ends 122 are threaded in order to receive a mating threaded fastener 148 (see FIGS. 8 and 9).

Referring now to FIGS. 4-7, a single stalk roll 124 is shown. Two of these stalk rolls 124 are configured to be mounted on the adjacent stalk roll drive shafts 106 in an interengaging relationship. The stalk roll that is not pictured herein is a mirror image of the illustrated stalk roll 124. Since the stalk rolls are mirror images, only one of these stalk rolls 124 is illustrated herein for convenience of illustration.

The stalk roll 124 is in the form of a unitary body. The body is monolithic and is made of cast iron. The body itself has a generally right circular cylindrical portion 126 toward the rear (left end as viewed in FIGS. 5 and 7) of the stalk roll that is coupled to a conical nose portion 128 near the forward end of the stalk roll.

A through hole 130 extends the entire length of the stalk roll opening on both ends of the stalk roll defining an inner surface 132 of the stalk roll. Through hole 130 is coaxial with longitudinal axis 110 when the stalk roll is assembled to the row unit gearcase 102. A portion 134 of the through hole 130 toward the rearward end of the stalk roll has an inner diameter sufficient to receive the entire length of the gearcase extensions 104.

Immediately forward of portion 134 extends a second portion 136 of through hole 130 with surface that has a smaller diameter and is a generally in the form of a right circular cylinder. A conical seat 137 is defined on the inner surface of the stalk roll 124 at the junction between portion 134 and second portion 136. The angle of this conical seat 137 is identical to the angle b of the conical seats 108 of the stalk roll drive shaft 106, thus providing intimate engagement of the conical seat 108 of the stalk roll drive shaft and the stalk roll itself over substantially the entire surface of both conical seats. The conical seat 137 opens to the rear of the stalk roll, facing the gearcase extension 104 when it is inserted into the stalk roll 124.

Figure 8:
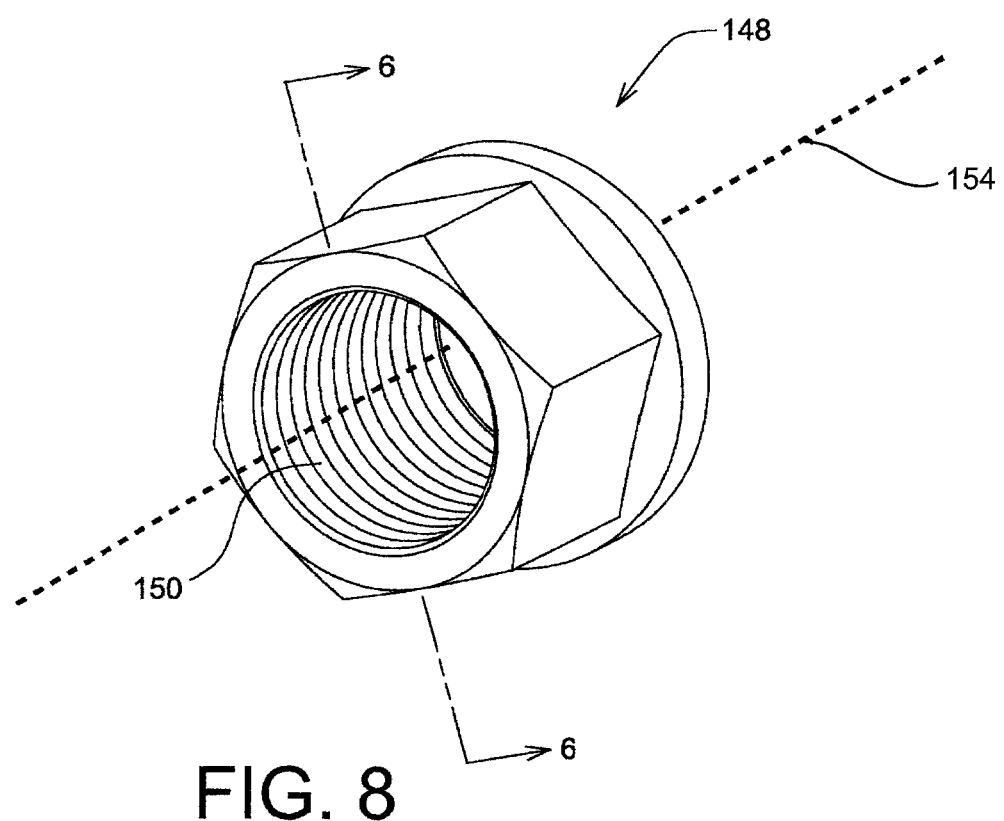
FIG. 8 is a perspective view of the threaded retaining fastener.
Figure 9:
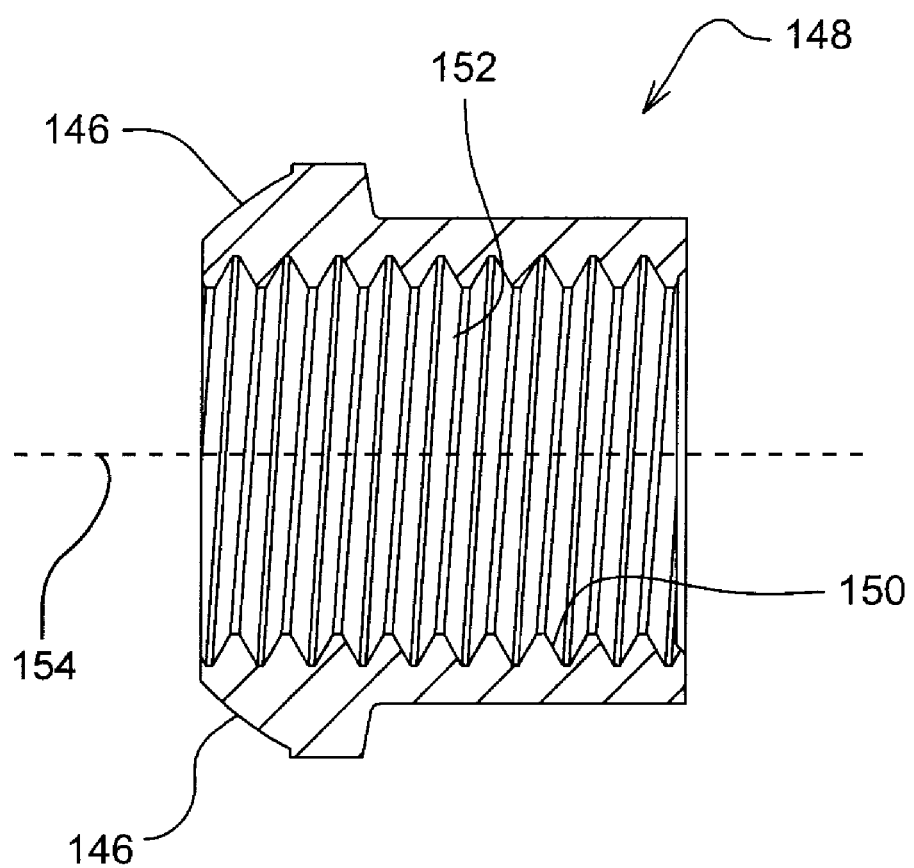
FIG. 9 is a cross-sectional view of the threaded retaining fastener of FIG. 8 taken at section line 9-9 in FIG. 8.

Second portion 136 is configured and disposed to mate with the drive shaft and has four longitudinal grooves 138 extending the length of second portion. These four grooves 138 are configured to slidingly receive the four longitudinal splines 116 when stalk roll drive shaft 106 is inserted into the through hole 130. A pair of grooves are angularly spaced at an acute angle Δ, for example, 45 degrees, from one another. The diametrally opposed pair are similarly spaced from one another. Immediately forward of the second portion 136 extends a third portion 140 of the through hole 130. This portion has a larger inner diameter than the diameter of second portion 136 and provides clearance for the forward end 122 of stalk roll drive shaft 106. Third portion 140 terminates at a fourth portion 142 of though hole 130 which has a smaller diameter than that of the third portion 140. The inner surface of fourth portion 142 defines a concave spherical seat 144 having a center 145 that lies on longitudinal axis 110. The term "spherical" will be understood to include portions of the surface of a complete sphere. This seat is symmetric about the longitudinal axis 110 and faces forward opening toward the forward end 147 of the stalk roll. Seat 144 has the same diameter as and is configured to engage mating convex spherical seat 146 which is disposed on threaded fastener 148 (FIGS. 8 and 9). Fastener 148 is configured to be threadedly engaged to the threaded section 120 of stalk roll drive shaft 106 to retain the stalk roll 124 on the forward end 122 of the stalk roll drive shaft 106.

The conical seats 108 and 137 of the stalk roll drive shaft and the stalk roll respectively are disposed closer to the splines 116 and grooves 138 than the spherical seats 144 and 146 in order to better coaxially orient the stalk roll and the stalk roll drive shaft in the vicinity of the splines and grooves. This helps maintain the two in coaxial alignment in the region of the splines and grooves. This is valuable since the splines and grooves communicate torque from the stalk roll driveshaft to the stalk roll itself and a superior alignment is beneficial to reduce uneven stresses and strain on the stalk roll and drive shaft mating surfaces. The spherical seats are disposed farther away from the grooves and splines to accommodate some axial misalignment of the stalk roll and the stalk roll drive shaft.

Referring now to FIGS. 8 and 9, threaded fastener 148 is generally formed as a hexagonal nut with internal threads 150 configured to engage the threads of threaded section 120 of the stalk roll. A central region 152 of the threaded portion of the fastener 148 is provided with a thread-locking compound to assist in retaining the threaded fastener on the end of the stalk roll drive shaft 106. Spherical seat 146 has a center lying on axis 154 and a radius matching the radius of spherical seat 144. Spherical seat 146 is configured to engage spherical seat 144. It self-aligns to provide for a full 360 degrees of surface contact, thereby providing sufficient friction to prevent fastener 148 from loosening. This self-alignment and the resulting strength of frictional engagement permits a single fastener 148 to be the sole element responsible for securing the stalk roll 124 on stalk roll drive shaft 106.

In use, the operator slides the rearward end of the stalk roll 124 onto the forward end of the stalk roll drive shaft 106, rotating the stalk roll as necessary to align the splines and grooves, until the two conical seats 108 and 137 engage each other, centering the rear portion of the stalk roll on the row unit gearcase extension 104. The threaded fastener 148 is then threaded onto the end of the stalk roll drive shaft until the two spherical seats 144 and 146 engage one another, centering the forward portion of the stalk roll on the forward portion of the stalk roll drive shaft. As the threaded fastener is tightened, it rotates as necessary about the center of the spherical seat to apply an even load over the spherical seat and evenly distribute the load around the circumference of the threads thereby capturing the stalk roll on the drive shaft between mating conical shaft and stalk roll portions toward one end and mating spherical shaft and fastener portions at the other stalk roll end.

Having described the preferred embodiment, it will become apparent that various modifications can be made without departing from the scope of the invention as defined in the accompanying claims.

The invention claimed is:

1. An agricultural harvesting machine, comprising:
   a feeder housing;
   a corn head having a frame attached to said feeder housing, said corn head including a common drive shaft, a plurality of row units each having a pair of stalk rolls, and a gearcase having a pair of gearcase extensions with cantilevered drive shafts extending therefrom;
   each stalk roll comprising an elongated generally cylindrical hollow body having a longitudinal axis of rotation, an inner surface extending the length of the stalk roll, a rear end receiving a corresponding one of the gearcase extensions and the stalk roll drive shaft extending from the gearcase extension, and a front end for receiving a threaded fastener, the inner surface defining a conical seat that opens toward said rear end and a spherical seat opening toward said front end; and
   a threaded fastener for each stalk roll having a threaded bore, and a spherical surface portion engaging the corresponding stalk roll spherical seat.

2. The agricultural harvesting machine of claim 1, wherein each conical seat is concentric with the longitudinal axis of the corresponding stalk roll.

3. The agricultural harvesting machine of claim 1, wherein each spherical seat is concentric with the longitudinal axis of the corresponding stalk roll.

4. The agricultural harvesting machine of claim 1, wherein each drive shaft has a region including longitudinally extending splines and each stalk roll has a region of inner surface grooves engaging corresponding splines, and wherein the spherical seat and the conical seat are disposed longitudinally on opposing sides of the region of inner surface grooves of the stalk roll.

5. The agricultural harvesting machine of claim 4, wherein the inner surface grooves are disposed closer to the conical seat than to the spherical seat.

6. The agricultural harvesting machine of claim 1, wherein each cantilevered drive shaft includes a threaded region near the free end thereof and each stalk roll is retained on a corresponding shaft solely by the threaded fastener.

7. An agricultural harvesting machine, comprising:
   a feeder housing; and
   a corn head having a frame attached to said feeder housing, said corn head including a common drive shaft, a plurality of row units each having a pair of stalk rolls, and a gearcase having a pair of gearcase extensions with cantilevered drive shafts extending therefrom;
   each stalk roll comprising an elongated generally cylindrical hollow body having a longitudinal axis of rotation, an inner surface extending the length of the stalk roll, a rear end receiving a corresponding one of the gearcase extensions and the stalk roll drive shaft extending from the gearcase extension, and a front end for receiving a threaded fastener, the inner surface defining a conical seat that opens toward said rear end and a spherical seat opening toward said front end, each drive shaft including a conical region close to the corresponding gearcase extension, and further including a threaded fastener for each stalk roll having a threaded bore and a spherical surface portion engaging the corresponding stalk roll spherical seat thereby capturing the stalk roll on the drive shaft between mating conical shaft and stalk roll portions toward one end and mating spherical shaft and fastener portions at the other stalk roll end.

8. A stalk roll for use in a corn head of an agricultural harvesting machine, comprising:
   an elongated generally cylindrical hollow body having a longitudinal axis of rotation, an inner surface extending the length of the stalk roll, a rear end receiving a stalk roll drive shaft, and a front end for receiving a threaded fastener, the inner surface defining a conical seat that opens toward said rear end and a spherical seat opening toward said front end, the drive shaft including a conical region, and further including a threaded fastener having a threaded bore and a spherical surface portion engaging the corresponding stalk roll spherical seat thereby capturing the stalk roll on the drive shaft between mating conical shaft and stalk roll portions toward one end and mating spherical shaft and fastener portions at the other stalk roll end.

9. The stalk roll in accordance with claim 8, wherein the conical seat is concentric with the longitudinal axis of the stalk roll.

10. The stalk roll in accordance with claim 8, wherein the spherical seat is concentric with the longitudinal axis of the stalk roll.

11. The stalk roll in accordance with claim 8, wherein the conical seat is disposed along the longitudinal axis closer to the rear end of the stalk roll than the spherical seat.

12. The stalk roll in accordance with claim 8, wherein each drive shaft has a region including longitudinally extending splines and each stalk roll has a region of inner surface grooves engaging corresponding splines, and wherein the spherical seat and the conical seat are disposed longitudinally on opposing sides of the region of inner surface grooves of the stalk roll.

13. The stalk roll in accordance with claim 12, wherein the grooves are disposed closer to the conical seat than the spherical seat.

14. A row unit for use in a corn head of an agricultural harvesting machine, comprising:
   a gearcase having a pair of gearcase extensions with a cantilevered drive shaft extending from each of the gearcase extensions; and
   a pair of stalk rolls each comprising an elongated generally cylindrical hollow body having a longitudinal axis of rotation, an inner surface extending the length of the stalk roll, a rear end receiving a corresponding one of the gearcase extensions and the drive shaft extending from the gearcase extension, and a front end for receiving a threaded fastener, the inner surface defining a conical seat that opens toward said rear end and a spherical seat opening toward said front end, each drive shaft including a conical region close to the corresponding gearcase extension, and further including a threaded fastener for each stalk roll having a threaded bore and a spherical surface portion engaging the corresponding stalk roll spherical seat thereby capturing the stalk roll on the drive shaft between mating conical shaft and stalk roll portions toward one end and mating spherical shaft and fastener portions at the other stalk roll end.

15. The row unit of claim 14, wherein each drive shaft has a region including longitudinally extending splines and each stalk roll has a region of inner surface grooves engaging corresponding splines, and wherein the spherical seat and the conical seat are disposed longitudinally on opposing sides of the region of inner surface grooves of the stalk roll.

16. The row unit of claim 15, wherein the inner surface grooves are disposed closer to the conical seat than to the spherical seat.

17. The row unit of claim 14, wherein each conical seat and each spherical seat is concentric with the longitudinal axis of the corresponding stalk roll.

18. The row unit of claim 14, wherein each cantilevered drive shaft includes a threaded region near the free end thereof and each stalk roll is retained on a corresponding shaft solely by a threaded fastener.

* * * * *